(12) United States Patent
Sun

(10) Patent No.: US 7,946,548 B2
(45) Date of Patent: May 24, 2011

(54) DISPLAY DEVICE

(75) Inventor: Zheng-Heng Sun, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 702 days.

(21) Appl. No.: 11/946,845

(22) Filed: Nov. 29, 2007

(65) Prior Publication Data
US 2008/0142659 A1 Jun. 19, 2008

(30) Foreign Application Priority Data

Dec. 19, 2006 (CN) .......................... 2006 1 0201333

(51) Int. Cl.
E04G 3/00 (2006.01)
(52) U.S. Cl. .............. 248/231.31; 248/231.61; 248/917; 248/919; 361/679.02
(58) Field of Classification Search .................. 248/917, 248/919, 920, 222.14, 226.11, 231.31, 231.61, 248/228.2, 228.5, 295.11, 297.21, 157; 361/679.02, 361/679.05, 679.21, 679.22
See application file for complete search history.

(56) References Cited

U.S. PATENT DOCUMENTS

| 4,844,388 | A | * | 7/1989 | Kuba et al. | ......................... 108/5 |
| 6,478,275 | B1 | * | 11/2002 | Huang | ......................... 248/284.1 |
| 7,121,516 | B1 | * | 10/2006 | Koh | ......................... 248/226.11 |
| 7,264,212 | B2 | * | 9/2007 | Hung | ......................... 248/282.1 |
| 7,487,944 | B2 | * | 2/2009 | Tisbo et al. | ......................... 248/288.51 |
| 7,489,500 | B2 | * | 2/2009 | Liou et al. | ......................... 361/679.21 |
| 2007/0262210 | A1 | * | 11/2007 | Oh et al. | ......................... 248/125.1 |
| 2008/0295301 | A1 | * | 12/2008 | Carnevali | ......................... 24/525 |

FOREIGN PATENT DOCUMENTS

CN 2620917 Y 6/2004
* cited by examiner

Primary Examiner — Terrell Mckinnon
Assistant Examiner — Steven M Marsh
(74) Attorney, Agent, or Firm — Frank R. Niranjan

(57) ABSTRACT

A display device includes a supporting member, a mounting plate, a fastener, and a monitor. The supporting member includes a base wall defining two through holes therein, and a clamping portion extending from a bottom portion thereof. The clamping portion is capable of contacting with an upper surface of the worktable. The mounting plate has two through holes defined therein configured for contacting with a lower surface of the worktable. The fastener extends through the through holes of the supporting member and the through holes of the mounting plate to sandwich the worktable. The monitor is provided with a pillar extending downward from a bottom portion thereof. The pillar of the monitor is attached to the supporting member.

8 Claims, 5 Drawing Sheets

DISPLAY DEVICE

BACKGROUND

1. Field of the Invention

The present invention relates to display devices, and more particularly to a flat panel display device.

2. Description of Related Art

Flat panel displays are more and more popularly used in offices. The relative lightness and compactness of flat panel displays (particularly in terms of front to back depth) make them particularly suitable for narrow workspaces. The characteristics of flat panel displays are particularly attractive in a small office/home office setting, because the relatively shallow front-to-back depth means that the display can be pushed back further from a user than would be possible with an equivalent cathode ray tube (CRT) monitor in many situations, taking up less precious desktop space in a user's work area.

Typically, a flat panel display includes a stand for supporting the flat panel display on the desk. The stand always takes up premium space on a desktop.

What is desired, therefore, is to provide a flat panel display which can economize workspace.

SUMMARY

In one embodiment, a display device includes a supporting member, a mounting plate, a fastener, and a monitor. The supporting member includes a base wall defining two through holes therein, and a clamping portion extending from a bottom portion thereof. The clamping portion is capable of contacting with an upper surface of the worktable. The mounting plate has two through holes defined therein configured for contacting with a lower surface of the worktable. The fastener extends through the through holes of the supporting member and the through holes of the mounting plate to sandwich the worktable. The monitor is provided with a pillar extending downward from a bottom portion thereof. The pillar of the monitor is attached to the supporting member.

Other advantages and novel features of the present invention will become more apparent from the following detailed description of preferred embodiment when taken in conjunction with the accompanying drawings, in which:

DETAILED DESCRIPTION

Figure 1:
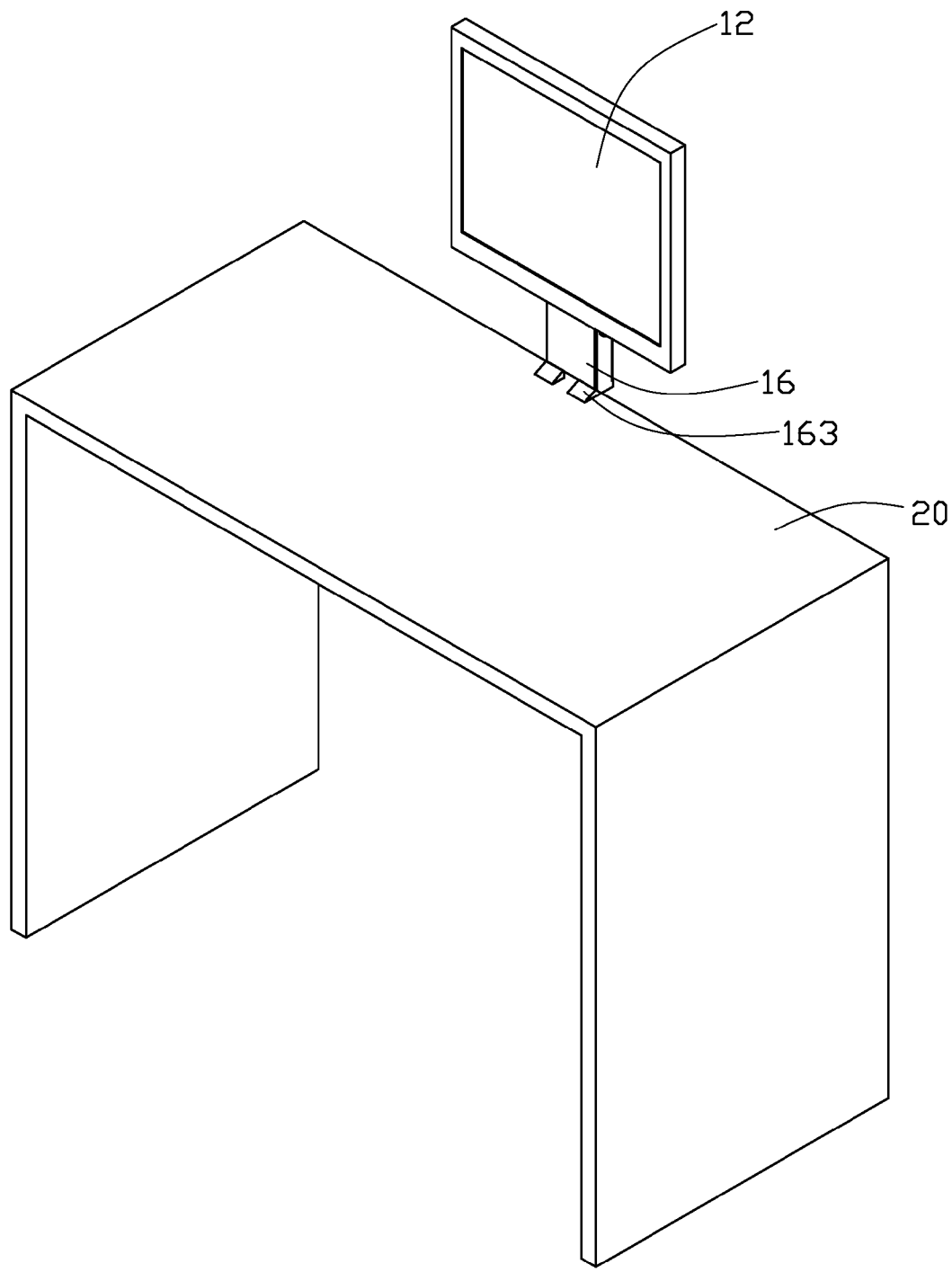
FIG. 1 is an assembled view of a display device in accordance with an embodiment, together with a worktable.
Figure 2:
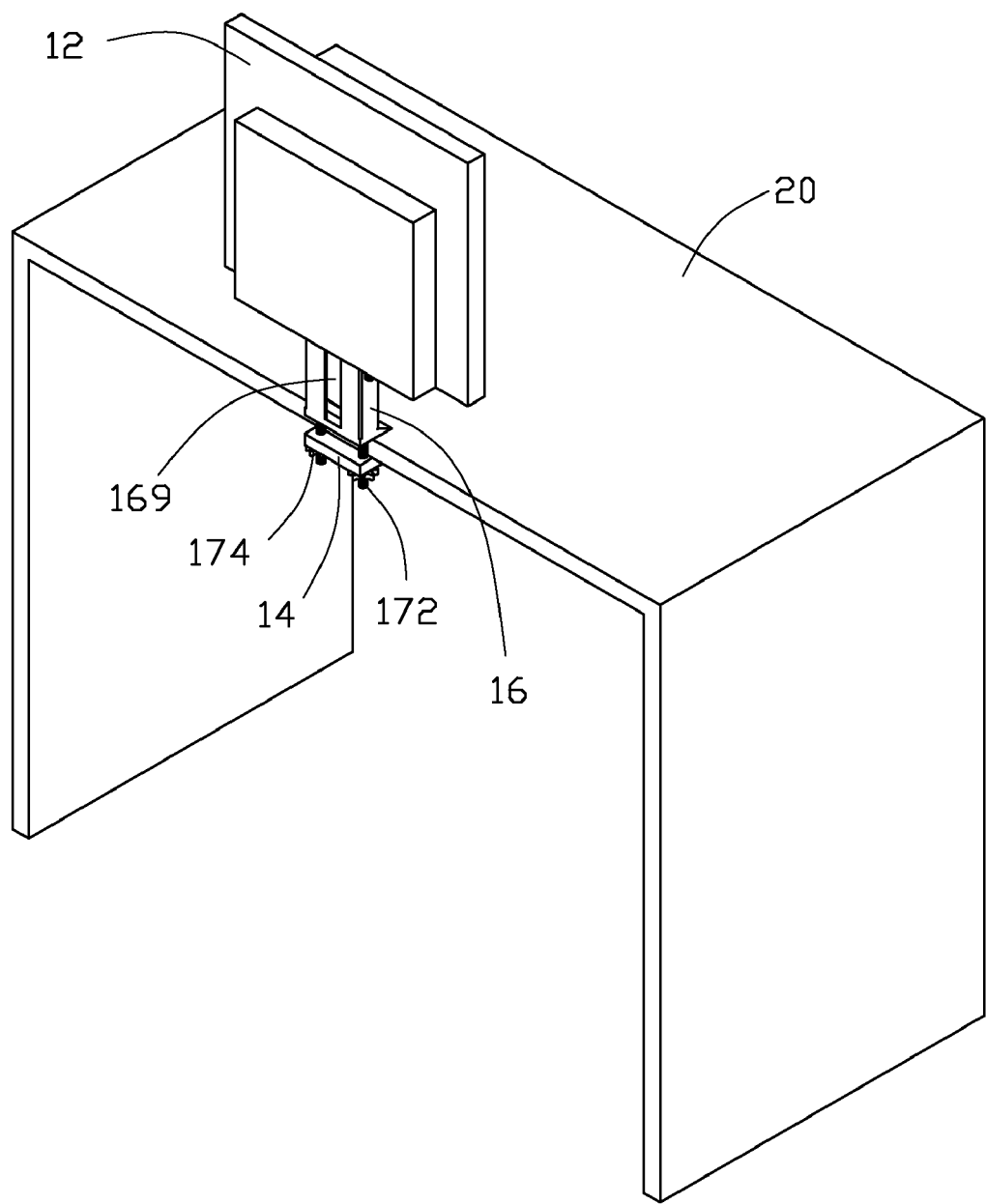
FIG. 2 shows another aspect view of FIG. 1.

Referring to FIGS. 1 and 2, in an embodiment, a display device is mounted on a worktable 20.

Figure 3:
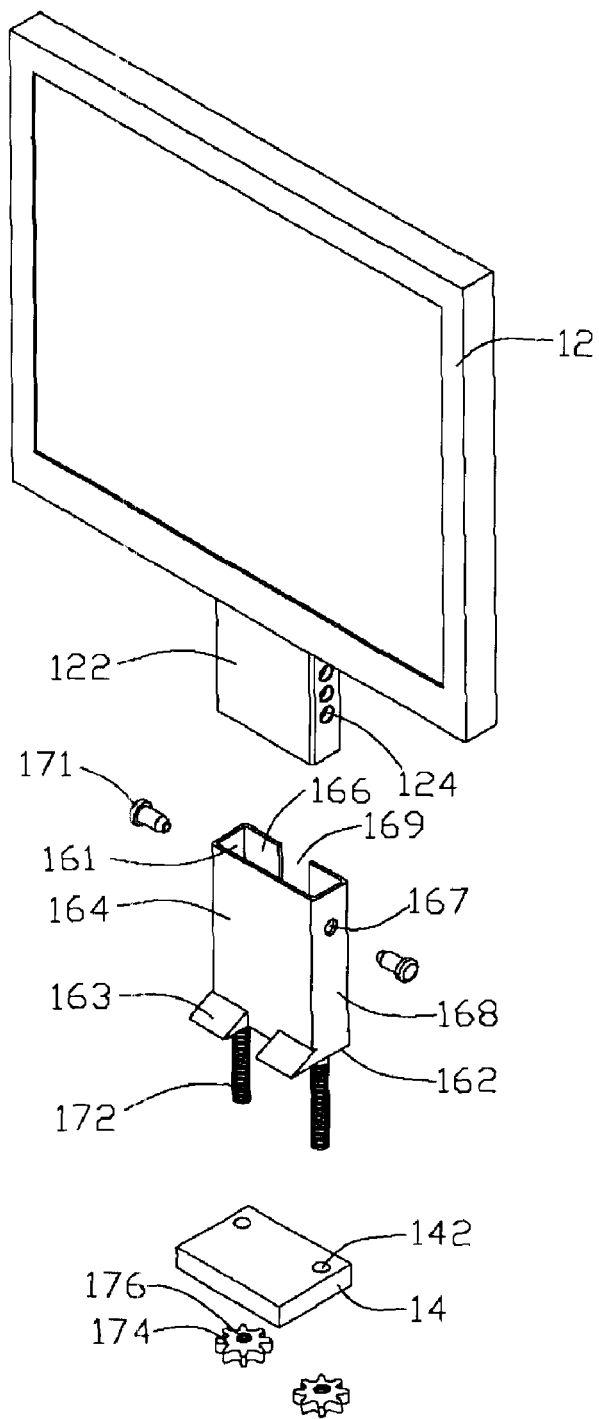
FIG. 3 is an exploded, isometric view of the display device of FIG. 1.
Figure 4:
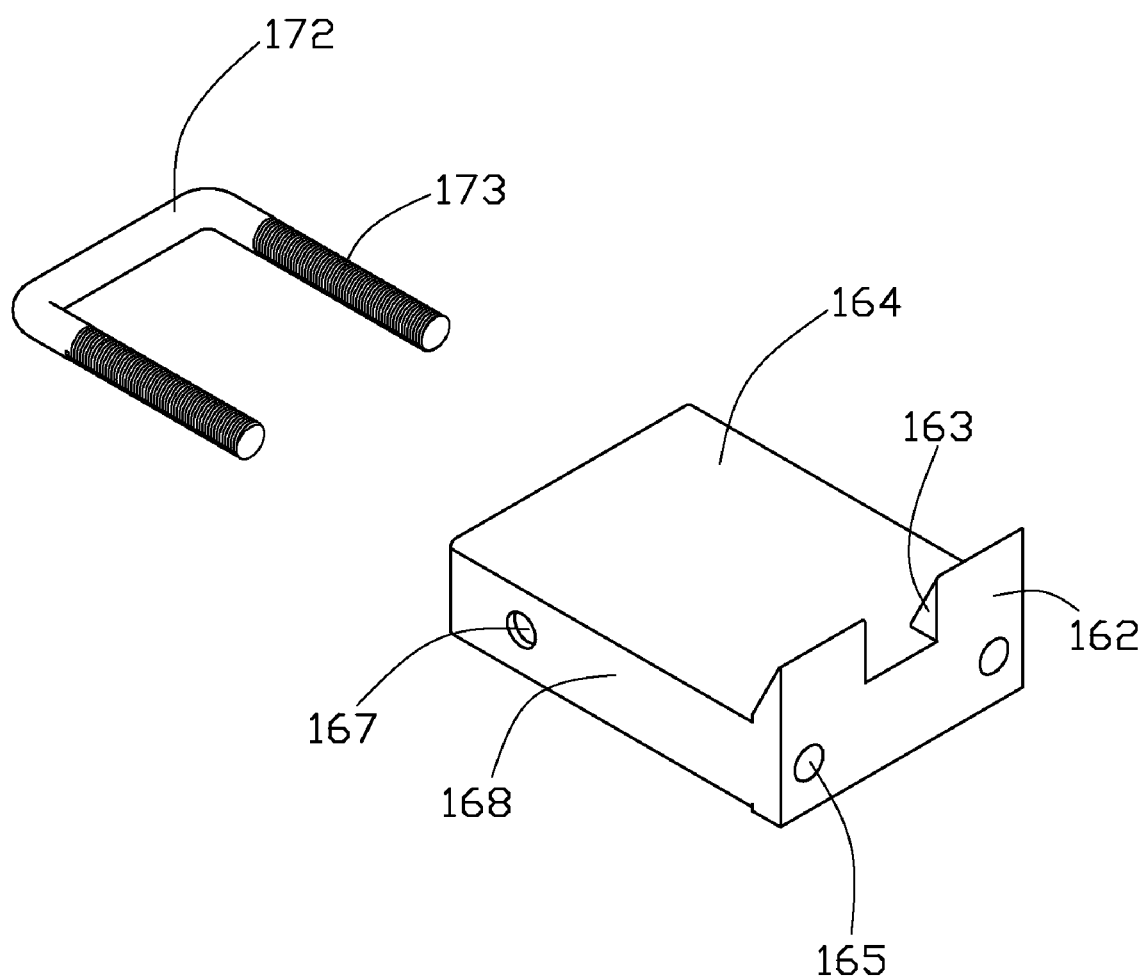
FIG. 4 is an enlarged view of parts of the display device of FIG. 3.

Referring also to FIGS. 3 and 4, the display device includes a monitor 12, a supporting member 16, a mounting plate 14, two screws 171, a fastener 172, and two nuts 174. The monitor 12 has a pillar 122 extending downward from a bottom thereof. A plurality of aligned threaded mounting holes 124 is defined in opposite sides of the pillar 122 respectively. The supporting member 16 is generally a rectangular hollow rack with an entrance 161 defined at one end thereof. The supporting member 16 includes a base wall 162, two first sidewalls 168 extending from two opposite sides of the base wall 162 respectively, a second sidewall 164 and a third sidewall 166 extending from the other opposite sides of the base wall 162. Two first through holes 167 are defined in the first sidewalls 168 respectively. Two second through holes 165 are defined in the base wall 162. An elongated cutout 169 is defined in an extending direction of the third sidewall 166. Two clamping portions 163 extend perpendicularly from a bottom portion of the second sidewall 164. The fastener 172 is U-shaped, and has two parallel arms 173. A plurality of screw threads is formed on two arms 173 of the fastener 172 respectively. Two through holes 142 are defined in a side portion of the mounting plate 14. The nuts 174 are generally gear-shaped. A screw hole 176 is defined in a center of each nut 174.

Figure 5:
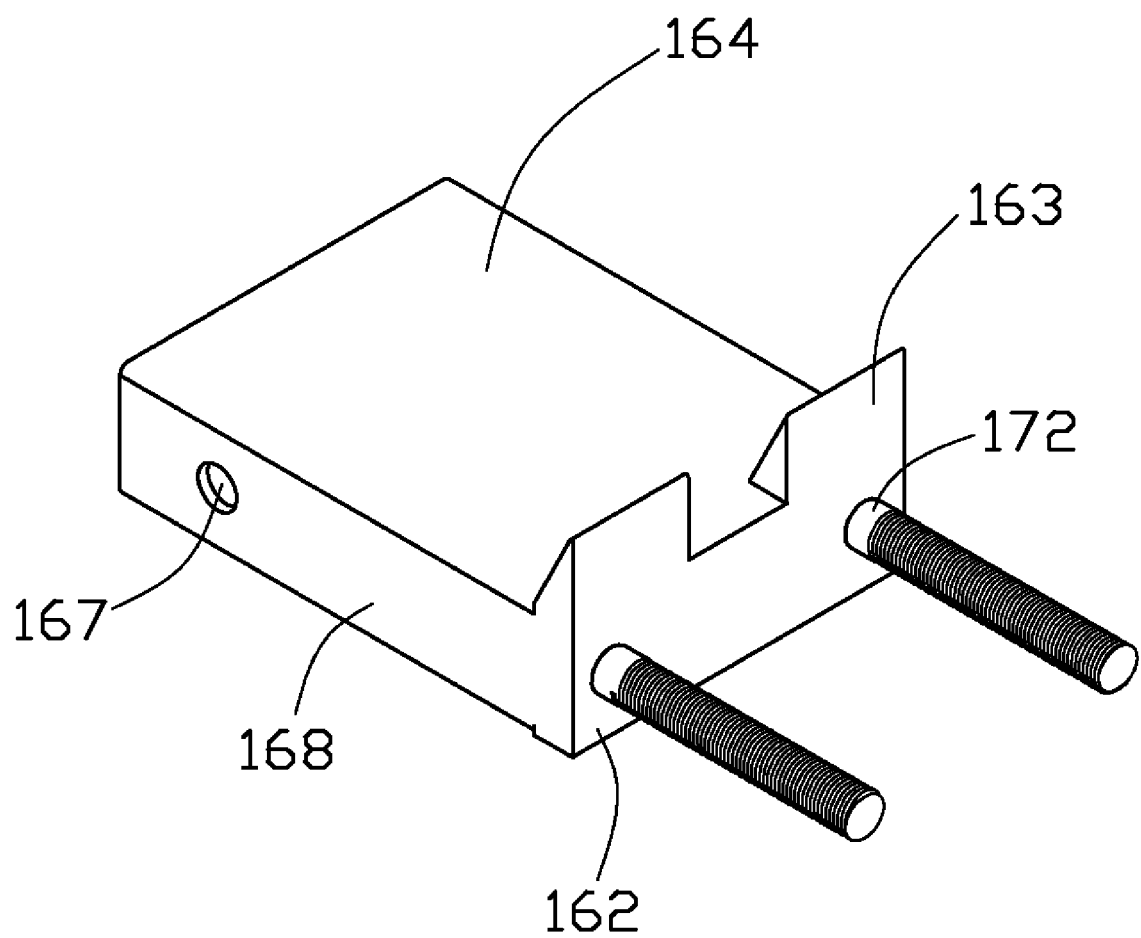
FIG. 5 is an assembled view of FIG. 4.

Referring also to FIG. 5, in assembly, the fastener 172 is placed in the supporting member 16 from the entrance 161 of the supporting member 16. The free ends of the fastener 172 extend outward through the second through holes 165 of the base wall 162 respectively. Two clamping portions 163 of the supporting member 16 are placed on an upper surface of an edge portion of the worktable 20. The arms 173 of the fastener 172 are contiguous with a side of the edge portion of the worktable 20. The mounting plate 14 is placed on a lower surface of the edge portion of the worktable 20. The arms 173 of the fastener 172 extend through the through holes 142 of the mounting plate 14 respectively. The nuts 174 are screwed on the arms 173 of the fastener 172 respectively to press firmly the mounting plate 14 against the lower surface of the edge portion of the worktable 20. Thus the supporting member 16 is secured to the edge portion of the worktable 20. The pillar 122 of the monitor 12 is inserted into the supporting member 16 via the entrance of the supporting member 16. The screws 171 extend through the first through holes 167 of the supporting member 16 to screw into the mounting holes 124 respectively. Therefore, the monitor 12 is mounted to the supporting member 16. The cutout 169 of the supporting member 16 is used for viewing the state of the pillar 122 being inserted into the supporting member 16 for facilitating the screws 171 correctly extending into the mounting holes 124.

It can be understood, the fastener 172 may be two separate bolts. The mounting holes 124 are used for adjusting the height of the monitor 12 via the screws 172 extending through the first through holes 167 to screw in the different mounting holes 124 respectively.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A display device comprising:

a supporting member comprising a base wall defining two through holes therein, and a clamping portion extending from a bottom portion thereof, the clamping portion being capable of contacting with an upper surface of a worktable;

a mounting plate configured for contacting with a lower surface of the worktable, two through holes defined in the mounting plate;

a fastener extending through the through holes of the supporting member and the through holes of the mounting plate to sandwich the worktable; and a monitor provided with a pillar extending downward from a bottom portion thereof, the pillar of the monitor attached to the supporting member;

wherein another two through holes are defined in two opposite sides of the supporting member, a plurality of threaded mounting holes are defined in two opposite sides of the pillar corresponding to the another two through holes of the supporting member, two screws extend through the another two through holes to screw into the corresponding threaded mounting holes.

2. The display device as described in claim 1, further comprising a nut screwed onto the fastener to press firmly against the mounting plate on the lower surface of the worktable.

3. A display device comprising:

a supporting member for being placed on an upper surface of a worktable, two through holes defined in two opposite sides of the supporting member, a cutout defined in a another side of the supporting member;

a mounting plate for being attached to a lower surface of the worktable;

a fastener connecting the supporting member with the mounting plate to sandwich the worktable; and a monitor provided with a pillar extending downward from a bottom portion thereof, two threaded mounting holes defined in two opposite sides of the pillar of the monitor corresponding to the through holes of the supporting member, two screws extending through the through holes of the supporting member to screw into the corresponding threaded mounting holes of the pillar;

wherein the cutout of the supporting member is configured for viewing the state of the pillar being inserted into the supporting member for facilitating the screws correctly extending into the mounting holes.

4. The display device as described in claim 3, wherein the supporting member comprises a base wall, two first sidewalls extending from two opposite sides of the base wall, a second sidewall and a third sidewall extending from the other two opposite sides of the base wall.

5. The display device as described in claim 4, wherein the fastener is U-shaped and has two arms, two through holes are defined in the base wall for the arms of the fastener extending therethrough respectively.

6. The display device as described in claim 4, wherein two clamping portions extend from a bottom portion of the second sidewall for supporting the supporting member on the upper surface of the worktable.

7. The display device as described in claim 4, wherein the supporting member comprises an entrance defined in a top portion thereof for receiving the pillar of the monitor.

8. The display device as described in claim 5, further comprising a two nuts screwed on the two arms of the fastener to press firmly against the mounting plate on the lower surface of the worktable.

\* \* \* \* \*